J. W. DUNCAN.
DEVICE FOR FILLING ICE CREAM CONES.
APPLICATION FILED SEPT. 8, 1910.
999,018. Patented July 25, 1911.
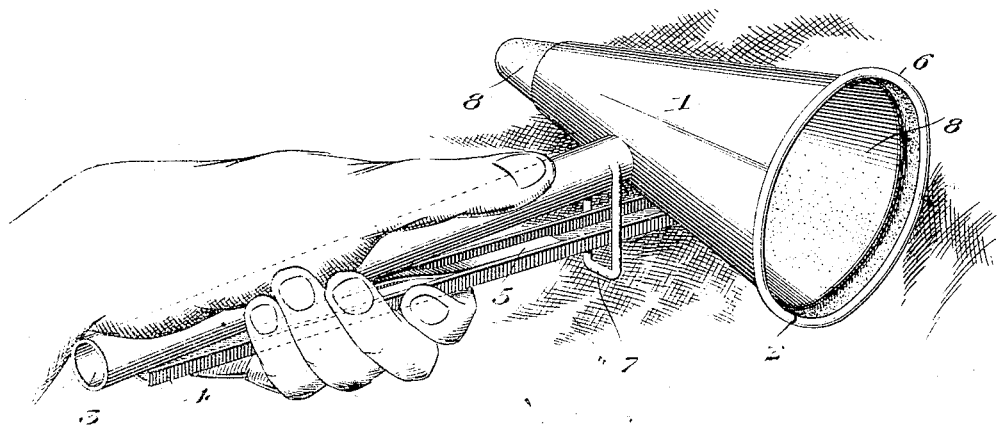
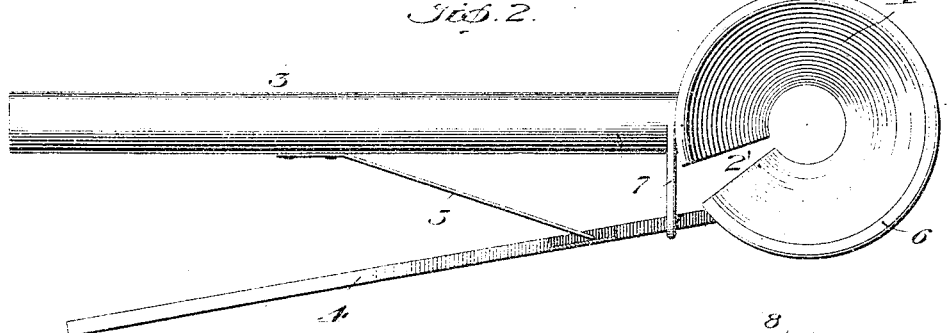
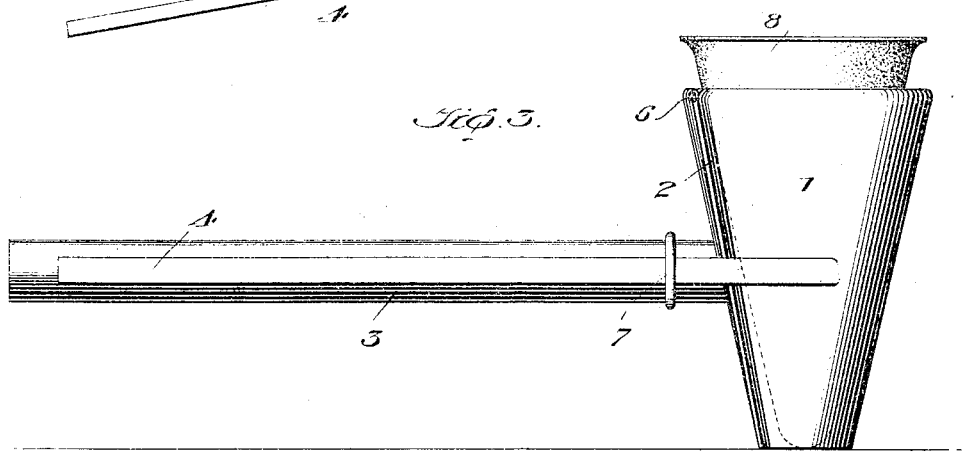
Witnesses
Inventor
John W. Duncan
By A. G. DuBois
his Attorney

UNITED STATES PATENT OFFICE.

JOHN W. DUNCAN, OF HOUTZDALE, PENNSYLVANIA.

DEVICE FOR FILLING ICE-CREAM CONES.

999,018.  Specification of Letters Patent.  Patented July 25, 1911.

Application filed September 8, 1910. Serial No. 581,118.

*To all whom it may concern:*

Be it known that I, JOHN W. DUNCAN, a citizen of the United States, residing at Houtzdale, in the county of Clearfield and State of Pennsylvania, have invented new and useful Improvements in Devices for Filling Ice-Cream Cones, of which the following is a specification.

The invention relates to devices for filling ice-cream cones; and it consists of a novel cone-holder, as will be hereinafter fully described, and briefly stated in the claims.

The chief object of the invention is to provide a device of the character mentioned, by means of which the cone may be readily and quickly filled while being held in the cup or holder of the device.

Other objects of the invention will become apparent upon the complete disclosure thereof.

In the drawing—Figure 1 is a perspective of my improved device held in the hand ready for filling; Fig. 2, a top plan view, and Fig. 3, a side elevation.

In the several views, the numeral 1 indicates a resilient truncated cone-shape cup, which has its wall split from top to bottom, as shown at 2, and provided, at one side of the split, with a handle 3 and at the other side of said split with a lever 4, preferably channel-shape in cross section, as shown in Fig. 1. Secured to the inner side of the handle is one end of a spring 5, the other end of said spring resting loosely in the channel of the lever.

The top edge of the cup is provided with a bead 6, which projects slightly over the inner wall of the holder to form a circular shoulder against which the top edge of the cone abuts, when seated in said cup, thus protecting the top edge of the cone from injury in the operation of filling the same, which is accomplished by plunging the cup and its contained cone into the ice-cream by a scooping action.

The cup is held normally open by the spring action of the bead 6 which is made of spring wire and the spring 5, the extent of opening being limited by a keeper 7.

When a cone 8 is seated in the cup, the inner surface of the cone will be flush with the inner periphery of the bead, by reason of its upper edge fitting close up under the bead 6, so that the ice-cream, as it is being scooped up, will be prevented from getting between the outer surface of the cone and the inner surface of the cup, thus keeping said outer surface of the cone clean and sightly, free of dripping cream which gives to the cone an unsightly and disfiguring appearance.

When a cone has been filled, it is readily and quickly removed from the cup by releasing the spring actuated lever and gently pressing the end of the filled cone against some object, when it can be lifted from the cup.

Having thus fully described my invention, what I claim, is:—

1. A cream cone filler, consisting of a split conical cup composed of a single piece of material having at its large end an inclined flange, and means for contracting the opposite side portions of the cup.

2. A cream cone filler, comprising a split conical cup formed from a single piece of material having at its opposite side portions handle members, one of which is radially disposed with relation to the cup, and the other tangentially disposed with relation to the side of the cup.

3. A cream cone filler, including a cup having relatively movable side portions and provided at its intake end with an inwardly disposed portion adapted to lie over the edge of a cone held within the body.

4. As an article of manufacture, an ice-cream cone holder having its wall split from top to bottom and its top edge provided with a bead of spring wire, a handle at one side of the split and a spring-actuated lever at the other side of said split.

5. As an article of manufacture, an ice-cream cone holder having its wall split from top to bottom, a handle at one side of the split, a spring-actuated lever at the other side of said split, and a keeper for limiting the extent of the opening of the cup.

In testimony whereof I have hereunto set my hand in presence of two subscribing witnesses

JOHN W. DUNCAN.

Witnesses:
JAMES PELLOW,
JOHN C. WILSON.